United States Patent
Getlin et al.

(10) Patent No.: US 12,381,582 B1
(45) Date of Patent: Aug. 5, 2025

(54) CHIP-SCALE CONTROL OF RECONFIGURABLE RADIO FREQUENCY FILTERS

(71) Applicant: Indiana Microelectronics, LLC, West Lafayette, IN (US)

(72) Inventors: Warren A. Getlin, Somerville, MA (US); Eric W. Rice, West Lafayette, IN (US); Eric E. Hoppenjans, West Lafayette, IN (US); Steven J. Cuppy, West Lafayette, IN (US); Fischer Bordwell, Henderson, NV (US); Michael J. McPheters, Wheaton, IL (US)

(73) Assignee: Indiana Microelectronics, LLC, West Lafayette, IN (US)

( * ) Notice: Subject to any disclaimer, the term of this patent is extended or adjusted under 35 U.S.C. 154(b) by 0 days.

(21) Appl. No.: 19/198,039

(22) Filed: May 3, 2025

Related U.S. Application Data

(60) Provisional application No. 63/642,300, filed on May 3, 2024.

(51) Int. Cl.
*H04B 1/00* (2006.01)
*H04B 17/21* (2015.01)

(52) U.S. Cl.
CPC ........... *H04B 1/0042* (2013.01); *H04B 17/22* (2023.05)

(58) Field of Classification Search
CPC ........ H04B 7/2606; H04B 1/006; H04B 1/40; H04B 7/1555; H04B 10/0775;
(Continued)

(56) References Cited

U.S. PATENT DOCUMENTS

| | | |
|---|---|---|
| 7,726,189 B2 | 6/2010 | Vyas et al. |
| 8,446,222 B2 | 5/2013 | Brenndorfer |

(Continued)

FOREIGN PATENT DOCUMENTS

| | | |
|---|---|---|
| EP | 2144370 A1 | 1/2010 |
| EP | 2282404 A1 | 2/2011 |

OTHER PUBLICATIONS

Arif et al., "All-Silicon Technology for High-Q Evanescent Mode Cavity Tunable Resonators and Filters," Journal of Microelectromechanical Systems, Jun. 2014, vol. 23, No. 3.
(Continued)

*Primary Examiner* — Ajibola A Akinyemi
(74) *Attorney, Agent, or Firm* — Barnes & Thornburg LLP

(57) ABSTRACT

A chip-scale controller for a reconfigurable radio frequency (RF) filter may include memory configured to store a calibration profile associating each of a plurality of digital command inputs with a plurality of digital to analog converter (DAC) codes, a plurality of digital to analog converters (DACs) each configured to generate an analog biasing output in response to one of a DAC code, a communication interface configured to receive a digital command input, and control registers configured to retrieve, from the memory, at least one plurality of DAC codes based on the received digital command input, to select a plurality of DAC codes based on the retrieved at least one plurality of DAC codes, and to provide the selected plurality of DAC codes to the plurality of DACs. At least the plurality of DACs, the communication interface, and the control registers form part of an application specific integrated circuit.

30 Claims, 4 Drawing Sheets

(58) Field of Classification Search
CPC ...... H04B 10/40; H04B 1/0003; H04B 1/005; H04B 1/406; H04B 1/66; H04B 10/70; H04B 7/043; H04B 7/0837; H04B 7/088
USPC ...................................................... 455/552.1
See application file for complete search history.

(56) References Cited

U.S. PATENT DOCUMENTS

| | | | |
|---|---|---|---|
| 8,598,969 | B1 | 12/2013 | Walker et al. |
| 8,665,040 | B1 | 3/2014 | Chappell |
| 9,979,372 | B2 | 5/2018 | Hoppenjans et al. |
| 2005/0040909 | A1* | 2/2005 | Waight .............. H03H 7/0153 333/17.1 |
| 2005/0212604 | A1* | 9/2005 | Cyr ........................ H01L 24/49 331/16 |
| 2007/0046397 | A1 | 3/2007 | Bajaj et al. |
| 2007/0257750 | A1 | 11/2007 | Tilmans et al. |
| 2011/0241802 | A1 | 10/2011 | Joshi et al. |
| 2012/0299651 | A1 | 11/2012 | Goel et al. |
| 2014/0055203 | A1 | 2/2014 | Villard |
| 2022/0113203 | A1* | 4/2022 | Ku ....................... G01J 5/0096 |

OTHER PUBLICATIONS

Chen et al., "Power Handling of High-Q Evanescent-Mode Tunable Filter with Integrated Piezoelectric Actuators," IEEE, 2012.
Fathelbab et al., "A Reconfigurable Bandpass Filter for RF/Microwave Multifunctional Systems," IEEE Transactions on Microwave Theory and Techniques, Mar. 2005, vol. 53, No. 3.
Gomez-Garcia et al., "Quasi-Elliptic Multi-Band Filters with Center-Frequency and Bandwidth Tunability," IEEE Microwave and Wireless Components Letters, 26:3, 2016, pp. 192-194.
Goodfellow et al., "Generative Adversarial Nets," Part of Advances in Neural Information Processing Systems 27 (NIPS 2014), 9 pages.
Holter et al., "On the size requirement for finite phased-array models," in IEEE Transactions on Antennas and Propagation, vol. 50, No. 6, pp. 836-840, Jun. 2002, doi: 10.1109/TAP.2002.1017665.
Hoppenjans et al., "A Vertically Integrated Tunable UHF Filter," Purdue University, 465 Northwestern Ave., West Lafayette, IN 47907, Microwave Symposium Digest (MTT), 2010 IEEE MTT-S International.
ISA/KR, Search Report and Written Opinion for PCT/US2015/027599, dated Mar. 31, 2016, 8 pages.
Jachowski et al., "Frequency-Agile Bandstop Filter with Tunable Attenuation," 2009 IEEE MTT-S International Microwave Symposium Digest, Boston, MA, USA, 2009, pp. 649-652.
Jachowski et al., "Octave Tunable Lumped-Element Notch Filter," 2012 IEEE/MTT-S International Microwave Symposium Digest, Montreal, QC, Canada, 2012, pp. 1-3.
Joshi et al., "High Q Narrow-Band Tunable Filters with Controllable Bandwidth," Department of Electrical and Computer Engineering, Birck Nanotechnology Center, Purdue University, West Lafayette, Indiana, 47907, USA, Microwave Symposium Digest, 2009. MTT '09. IEEE MTT-S International.
Joshi et al., "High-Q Fully Reconfigurable Tunable Bandpass Filters," IEEE Transactions on Microwave Theory and Techniques, Dec. 2009, vol. 57, No. 12.
Joshi et al., "Tunable High Q Narrow-Band Triplexer," Department of Electrical and Computer Engineering, Birck Nanotechnology Center, Purdue University, West Lafayette, Indiana, 47907, USA, Microwave Symposium Digest, 2009. MTT '09. IEEE MTT-S International.
Kingma et al., "Adam: A Method for Stochastic Optimization," published as a conference paper at ICLR 2015, 15 pages.
Lee et al., "Frequency-Agile Field-Programmable Filter Array (FPFA) with Multiple Functionalities," School of Electrical and Computer Engineering, Purdue University, West Lafayette, 47906, USA, Microwave Symposium Digest (MTT), 2011 IEEE MTT-S International, 2011.
Lee et al., "Tunable Inter-Resonator Coupling Structure With Positive and Negative Values and Its Application to the Field-Programmable Filter Array (FPFA)," IEEE Transactions on Microwave Theory and Techniques, Dec. 2011, vol. 59, No. 12.
Liu et al., "High-Q Tunable Microwave Cavity Resonators and Filters using SOI-based RF MEMS Tuners," Journal of Microelectromechanical Systems, Feb. 2010.
Liu, "High-Q RF MEMS Tunableresonators and Filters for Reconfigurable Radio Frequency Front-Ends," A Dissertation Submitted to the Faculty of Purdue University, In Partial Fulfillment of the Requirements for the Degree of Doctor of Philosophy, Aug. 2010, Purdue University, West Lafayette, Indiana.
Loverich, "Discontinuous Piecewise Polynomial Neural Networks," pre-print submitted to Elsevier Sep. 24, 2018, 33 pages.
Lu et al., "A Low-Power, Wide-Dynamic-Range Semi-Digital Universal Sensor Readout Circuit Using Pulsewidth Modulation," IEEE Sensors Journal, May 2011, vol. 11, No. 5.
Naglich et al., "Bandpass-Bandstop Filter Cascade Performance Over Wide Frequency Tuning Ranges," Microwave Theory and Techniques, IEEE Transactions on, vol. 58, No. 12., Dec. 2010.
Naglich et al., "Tunable, Substrate Integrated, High Q Filter Cascade for High Isolation," Microwave Symposium Digest (MTT), 2010 IEEE MTT-S International.
Rogers Corp., RO4000 Series of Laminates, Apr. 2014, http://www.rogerscorp.com/documents/726/acm/RO4000-Laminates.
Sigmarsson et al., "In-Situ Control of Tunable Evanescent-Mode Cavity Filters Using Differential Mode Monitoring", IMS, Boston, 2009, pp. 633-636.
Simpson et al., "UHF-Band Bandpass Filters with Fully-Reconfigurable Transfer Function," 2018 International Applied Computational Electromagnetics Society Symposium (ACES), 2 pages.
Skyworks Solutions, Inc., "SMV1405 to SMV1430 Series: Plastic-Packaged Abrupt Junction Tuning Varactors," Jan. 20, 2020, 10 pages.
Small et al., "A Fast High-Q X-band RF-MEMS Reconfigurable Evanescent-Mode Cavity Resonator," IEEE Transactions on Microwave Theory and Techniques, Dec. 2009, vol. 57, No. 12.

* cited by examiner

CHIP-SCALE CONTROL OF RECONFIGURABLE RADIO FREQUENCY FILTERS

CROSS-REFERENCE TO RELATED APPLICATION

This application claims the benefit of U.S. Provisional Patent Application No. 63/642,300, filed May 3, 2024 (entitled "Chip-Scale Controller for Reconfigurable Microwave Filters"), the entire disclosure of which is incorporated by reference herein.

TECHNICAL FIELD

The present disclosure relates generally to reconfigurable radio frequency (RF) filters, such as microwave filters, and more particularly to systems and methods for chip-scale control of reconfigurable RF filters.

BACKGROUND

Modern communication systems, particularly military systems, often require reconfigurable RF filters (e.g., microwave filters) capable of dynamically changing their frequency response in real time across a wide tuning range. Numerous architectures for microwave filters have been proposed in recent years that enable the tuning of various filter parameters, such as through the tuning of transmission zeros. These advanced architectures can employ Q-enhancing concepts that permit filter responses with lower insertion losses and sharper roll-offs. But the necessary parameters must be precisely tuned to achieve the desired frequency response with a low insertion loss.

SUMMARY

According to one aspect, a controller for a reconfigurable RF filter may include memory configured to store a calibration profile associating each of a plurality of digital command inputs with a plurality of digital to analog converter (DAC) codes, a plurality of digital to analog converters (DACs) each configured to generate an analog biasing output in response to a DAC code, a communication interface configured to receive a digital command input, and control registers configured to retrieve, from the memory, at least one plurality of DAC codes based on the received digital command input, to select a plurality of DAC codes based on the retrieved at least one plurality of DAC codes, and to provide the selected plurality of DAC codes to the plurality of DACs. At least the plurality of DACs, the communication interface, and the control registers form part of an application specific integrated circuit (ASIC).

In some embodiments, each of the plurality of digital command inputs represents a different center frequency setpoint for the reconfigurable RF filter. In other embodiments, each of the plurality of digital command inputs represents a different combination of center frequency and bandwidth setpoints for the reconfigurable RF filter. In some embodiments, the retrieved at least one plurality of DAC codes may comprises a first plurality of DAC codes associated with a first center frequency setpoint below a selected center frequency setpoint represented by the received digital command input and a second plurality of DAC codes associated with a second center frequency setpoint above the selected center frequency setpoint represented by the received digital command input, and the control registers may be configured to select a plurality of DAC codes based on the retrieved at least one plurality of DAC codes by interpolating between the DAC codes of the first and second pluralities of DAC codes.

In some embodiments, each analog biasing output is a bias voltage configured to control a corresponding varactor of the reconfigurable RF filter. In other embodiments, each analog biasing output is configured to control a corresponding current-controlled tuning element of the reconfigurable RF filter. In still other embodiments, each analog biasing output is configured to control a corresponding magnetically-controlled tuning element of the reconfigurable RF filter.

In some embodiments, the memory is also part of the ASIC. In other embodiments, the memory is not part of the ASIC and is communicatively coupled to the ASIC. In some embodiments, the memory comprises flash memory.

In some embodiments, each DAC of the plurality of DACs is a sigma-delta DAC. In some embodiments, the calibration profile is customized to the controller to account for manufacturing tolerance in the plurality of DACs and is loaded in the memory.

In some embodiments, the calibration profile associates each of the plurality of digital command inputs with a plurality of DAC codes for each of a plurality of temperatures, and the control registers are further configured to receive data indicative of a sensed temperature and to retrieve the at least one plurality of DAC codes based on the received digital command input and the received data indicative of the sensed temperature. In some embodiments, the retrieved at least one plurality of DAC codes may comprise a first plurality of DAC codes associated with the received digital command input and a first temperature of the plurality of temperatures that is below the sensed temperature and a second plurality of DAC codes associated with the received digital command input and a second temperature of the plurality of temperatures that is above the sensed temperature, and the control registers may be configured to select a plurality of DAC codes based on the retrieved at least one plurality of DAC codes by interpolating between the DAC codes of the first and second pluralities of DAC codes.

In some embodiments, the control registers are further configured to periodically alternate the selected plurality of DAC codes provided to the plurality of DACs to allow the reconfigurable RF filter to frequency hop.

In some embodiments, the control registers are further configured to selectively enter an auto-tune mode in which the control registers receive sensor data indicative of a frequency of an undesirable signal, retrieve at least one plurality of DAC codes associated with that frequency from the memory, select a plurality of DAC codes based on the retrieved at least one plurality of DAC codes, and provide the selected plurality of DAC codes to the plurality of DACs to cause the filter to attenuate the undesirable signal and pass other signals. In other embodiments of the auto-tune mode, the control registers receive sensor data indicative of a frequency of a desirable signal, retrieve at least one plurality of DAC codes associated with that frequency from the memory, select a plurality of DAC codes based on the retrieved at least one plurality of DAC codes, and provide the selected plurality of DAC codes to the plurality of DACs to cause the filter to pass the desirable signal and attenuate other signals.

In some embodiments, the control registers are further configured to selectively enter a calibration mode in which direct access to at least one of the memory and the plurality of DACs is provided via the communication interface.

According to another aspect, a reconfigurable RF filter system may comprise a reconfigurable RF filter having a plurality of biasing terminals and any of the controllers described above. Each of the plurality of biasing terminals of the reconfigurable RF filter may be communicatively coupled to one of the plurality of DACs of the controller to receive the corresponding analog biasing output. In some embodiments, the calibration profile is customized to the controller and to the reconfigurable RF filter and is loaded in the memory of the controller. In some embodiments, the reconfigurable RF filter is a reconfigurable microwave filter.

According to yet another aspect, a phased array system may comprise a plurality of antennas each intersecting a first plane, where each antenna of the plurality of antennas is spaced from at least one other antenna of the plurality of antennas in the first plane by no more than a half-wavelength of a highest frequency signal handled by the phased array system. The phased array system may further comprise a plurality of any of the reconfigurable RF filter systems described above, with each such system positioned adjacent to a corresponding antenna of the plurality of antennas with its reconfigurable RF filter communicatively coupled to the corresponding antenna. In some embodiments, an area occupied by each of the plurality of the reconfigurable RF filter systems in a second plane parallel to the first plane is no more than the half-wavelength squared.

According to still another aspect, a method may comprise receiving, with an ASIC, a digital command input representing a center frequency setpoint for a reconfigurable RF filter communicatively coupled to the ASIC; retrieving, from a memory associated with the ASIC, at least one plurality of DAC codes in response to receiving the digital command input; selecting a plurality of DAC codes based on the retrieved at least one plurality of DAC codes; and providing the selected plurality of DAC codes to a plurality of DACs of the ASIC to generate a plurality of analog biasing outputs, where each DAC of the plurality of DACs generates one of the plurality of analog biasing outputs in response to one of the selected plurality of DAC codes.

In some embodiments, the method may further comprise storing a calibration profile in the memory, wherein the calibration profile is customized to at least one of the ASIC and the reconfigurable RF filter and associates each of a plurality of digital command inputs with a plurality of DAC codes.

In some embodiments, the method may further comprise providing the plurality of analog biasing outputs generated by the plurality of DACs of the ASIC to a plurality of biasing terminals of the reconfigurable RF filter to tune a center frequency of the reconfigurable RF filter to the center frequency setpoint. In some embodiments, the digital command input further represents a bandwidth setpoint for the reconfigurable RF filter, and providing the plurality of analog biasing outputs to the plurality of biasing terminals of the reconfigurable RF filter also tunes a bandwidth of the reconfigurable RF filter to the bandwidth setpoint.

In some embodiments, providing the plurality of analog biasing outputs to the plurality of biasing terminals of the reconfigurable RF filter comprises providing the plurality of analog biasing outputs to a plurality of biasing terminals of a reconfigurable microwave filter (RMF). In some embodiments, the plurality of analog biasing outputs comprise bias voltages, and providing the plurality of analog biasing outputs to the plurality of biasing terminals of the RMF provides the bias voltages to varactors of the RMF.

In some embodiments, providing the plurality of analog biasing outputs to the plurality of biasing terminals of the reconfigurable RF filter operates current-controlled tuning elements of the reconfigurable RF filter. In other embodiments, providing the plurality of analog biasing outputs to the plurality of biasing terminals of the reconfigurable RF filter operates magnetically-controlled tuning elements of the reconfigurable RF filter.

In some embodiments, the method may further comprise transmitting a signal through the reconfigurable RF filter to an adjacent antenna of a phased array while the center frequency of the reconfigurable RF filter is tuned to the center frequency setpoint. The adjacent antenna may be spaced apart from another antenna of the phased array in a first plane intersected by both the adjacent antenna and the another antenna by no more than a half-wavelength of a highest frequency component of the signal. In some embodiments, an area occupied by the reconfigurable RF filter and the ASIC in a second plane parallel to the first plane is no more than the half-wavelength squared.

BRIEF DESCRIPTION

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

While the concepts of the present disclosure are susceptible to various modifications and alternative forms, specific exemplary embodiments thereof have been shown by way of example in the figures and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Figure 1:
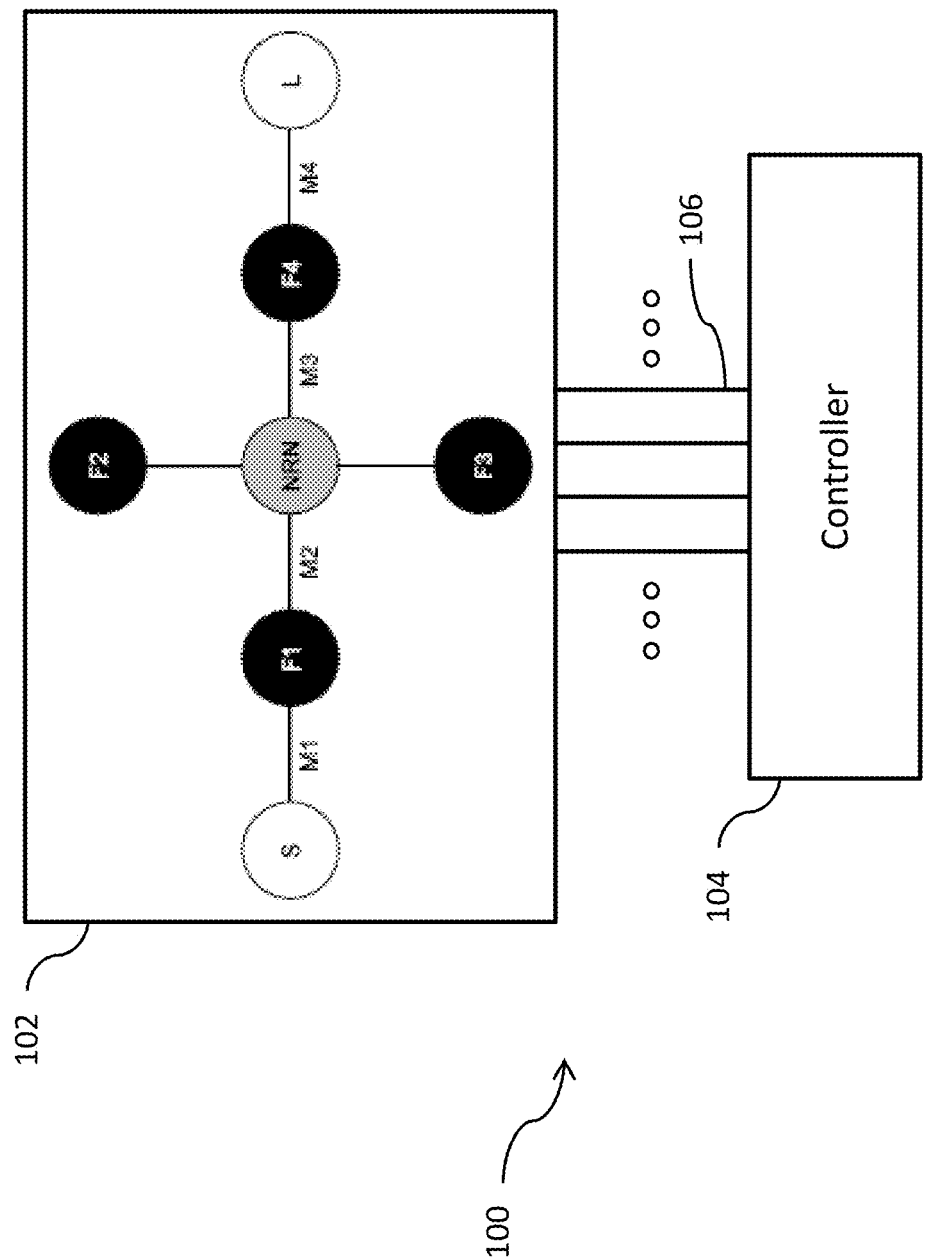
FIG. 1 is a simplified diagram of one illustrative embodiment of a reconfigurable radio frequency (RF) filter system including a reconfigurable RF filter and a controller communicatively coupled to a plurality of biasing terminals of the reconfigurable RF filter.

Referring now to FIG. 1, one illustrative embodiment of a reconfigurable radio frequency (RF) filter system 100 is shown. This system 100 includes a reconfigurable RF filter 102 embodied as a reconfigurable microwave filter having an adjustable center frequency ($f_c$) and an adjustable bandwidth ($\Delta f$) that are tunable by a controller 104 communicatively coupled to a set of biasing terminals 106 of the filter 102. The illustrative filter 102 includes four tunable resonances F1-F4 connected to one another by a non-resonant node (NRN), creating two tunable poles and two tunable zeroes that all increase or decrease $f_c$ monotonically with themselves. Combining the two poles and two zeroes creates a non-monotonic third pole, leading to a transfer function with five elements and a high degree of tuning complexity. The physical resonator F1 can be coupled to a source S via a fixed coupling M1, while the physical resonator F4 can be coupled to a load L via a fixed coupling M4. In the illustrative embodiment, internal couplings M2, M3 are also fixed, such that the illustrative filter 102 has four tunable input parameters (specifically, the bias voltages applied to the physical resonators F1-F4).

In another embodiment having a more complex filter architecture, the internal couplings M2, M3 of filter 102 can also be tunable (monotonically with Δf but uncoordinated with $f_c$), creating a set of six tunable input parameters. It will be appreciated that these architectures for the reconfigurable RF filter 102 are merely illustrative and that the presently disclosed devices, systems, and methods are useful in controlling (as well as calibrating) any number of reconfigurable RF filter architectures. Other exemplary architectures for the filter 102 are described in U.S. Pat. No. 9,979,372, filed Apr. 24, 2015; U.S. patent application Ser. No. 18/116,454, filed Mar. 2, 2023; Simpson et al., "UHF-band bandpass filters with fully-reconfigurable transfer function," 2018 International Applied Computational Electromagnetics Society Symposium (ACES); and Gomez-Garcia et al., "Quasi-elliptic multi-band filters with center-frequency and bandwidth tunability," IEEE Microwave and Wireless Components Letters, 26:3:192-194, 2016, (the entire disclosures of which are all incorporated by reference herein). It is also contemplated that, in some embodiments according to the present disclosure, the reconfigurable RF filter 102 may have an adjustable center frequency ($f_c$), but not an adjustable bandwidth (Δf), or vice versa.

The controller 104 simplifies the integration of the reconfigurable RF filter 102 into digitally controlled RF systems by abstracting precise, multichannel control (provided to the filter 102 via the biasing terminals 106) into a digital command input representing the desired center frequency and/or bandwidth setpoint(s). In the illustrative embodiment, further described below, the controller 104 generates a set of analog biasing outputs in the form of a set of bias voltages and provides each bias voltage in the set to a different varactor (not shown) of the filter 102 via one of the biasing terminals 106. Each bias voltage controls a capacitance of the corresponding varactor, thereby tuning the center frequency and/or bandwidth of the filter 102. The analog biasing outputs generated by the controller 104 may additionally or alternatively be configured to operate current-controlled tuning elements and/or magnetically-controlled tuning elements of a reconfigurable RF filter 102 (either directly or through intervening circuitry that converts bias voltages generated by the controller 104 into bias currents and/or bias magnetic fields). While the filter 102 is illustrated in the drawings as having four biasing terminals 106, the filter 102 may have any number of biasing terminals 106, and the controller 104 may generate any number of analog biasing outputs needed to tune the filter 102.

Figure 2:
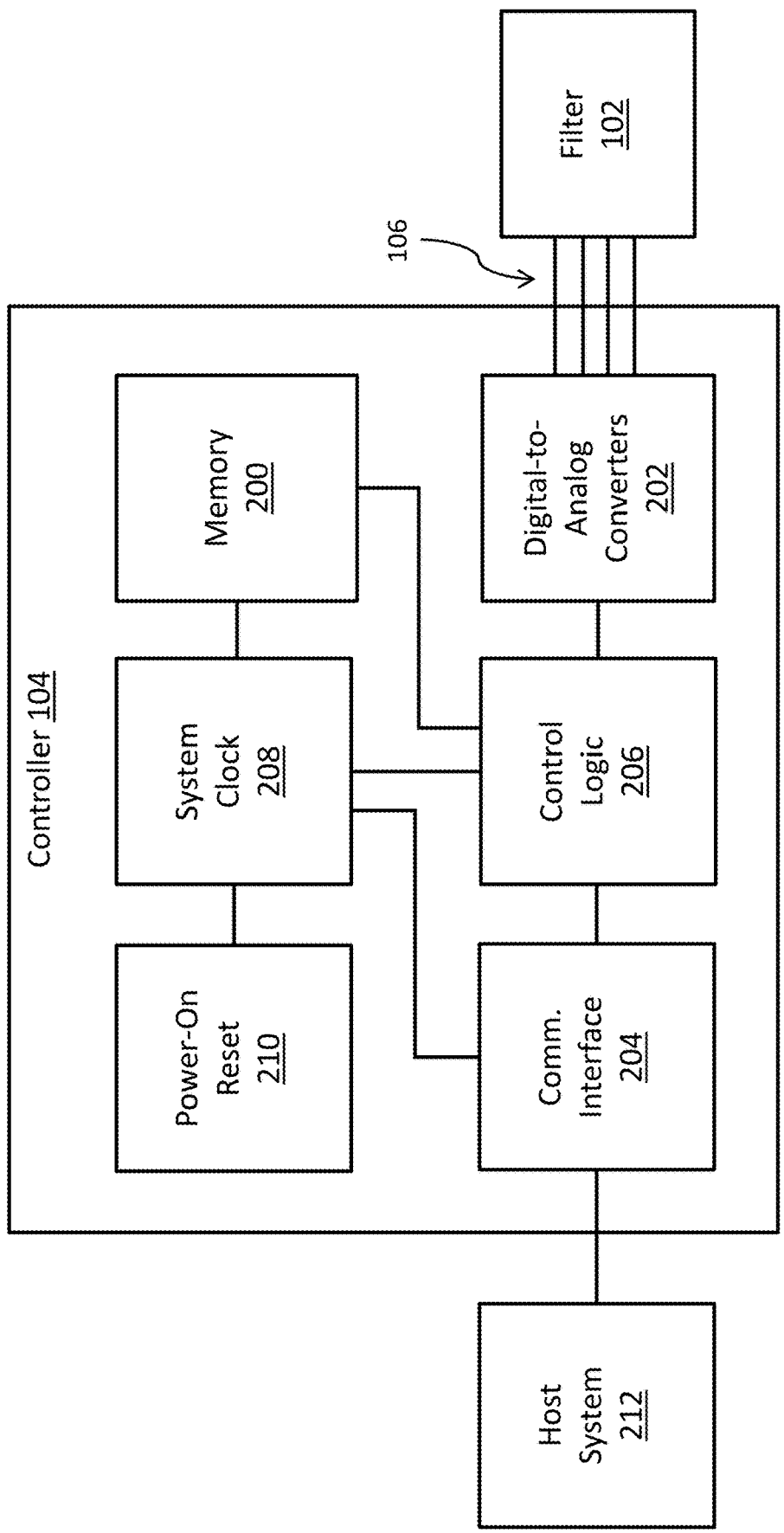
FIG. 2 is a simplified diagram of the reconfigurable RF filter system of FIG. 1 communicatively coupled to a host controller, showing additional detail regarding various functional blocks of the controller according to this embodiment.

Referring now to FIG. 2, various components of the controller 104 are shown in greater detail as a block diagram. The role of the controller 104 as an interface between the reconfigurable RF filter 102 and a host system 212 of a larger system is also illustrated in FIG. 2. As described further below, the controller 104 receives digital command inputs (e.g., digital command words) from the host system 212 and controls operation of the filter 102 in response to these digital command inputs. In the illustrative embodiment, the controller 104 includes a memory 200, a set of digital-to-analog converters (DACs) 202, a communication interface 204, control logic 206, a system clock 208, and a power-on reset 210, among other components. It will be appreciated by those skilled in the art that the controller 104 can (and usually will) include additional components that are not illustrated in FIG. 2 for clarity. For instance, the controller 104 may also include an internal communication bus to facilitate communication between the components of the controller 104 illustrated in FIG. 2. This internal communication bus can use any protocol appropriate to interface with the other components of the controller 104. By way of example, the internal communication bus might utilize a parallel data buffer and strobe signal (e.g., with resistor ladder DACs) or be implemented as a standard serial protocol utilizing shift registers.

According to the present disclosure, at least some of the components of the controller 104 form part of an application specific integrated circuit (ASIC). In the illustrative embodiment, each of the memory 200, the DACs 202, the communication interface 204, the control logic 206, the system clock 208, and the power-on reset 210 are implemented as an ASIC. In other embodiments, some but not all of these components may form part of the ASIC, while the remaining components are embodied as one or more separate chips (or other discrete components) that are communicatively coupled (e.g., wire-bonded) to the ASIC. By way of example, one particular embodiment that is contemplated by the present disclosure is an ASIC comprising the DACs 202, the communication interface 204, the control logic 206, the system clock 208, and the power-on reset 210, while the memory 200 is provided by a separate flash memory chip that is wire-bonded to the controller 104 (e.g., via the communication interface 204). The presently disclosed ASIC implementations allow the reconfigurable RF filter system 100 to used in size-constrained applications (such as with a phased antenna array, see FIG. 4, further described below). By way of illustrative example, in some embodiments, the presently disclosed reconfigurable RF filter systems 100 may each occupy a chip area of less than 2 square centimeters. By contrast, if the functionality of the presently disclosed reconfigurable RF filter systems 100 were instead implemented on a printed circuit board (PCB) using discrete components, such a design would typically require a PCB with dimensions of at least 7 square centimeters.

Whether integrated in or external to the ASIC, the memory 200 of the controller 104 is configured to store at least one calibration profile that associates each of a plurality of digital command inputs with a plurality of digital to analog converter (DAC) codes. As described above, the digital command inputs may be embodied as digital command words that each represent a different desired center frequency for the filter 102 associated with the controller 104. In some embodiments, each digital command input (e.g., digital command word) may additionally or alternatively represent a different desired bandwidth for the filter 102 associated with the controller 104. The calibration profile associates each of these digital command inputs with the set of DAC codes that can be provided to the DACs 202 of the controller 104 to cause the DACs 202 to generate analog bias outputs that, when provided to the filter 102, tune the filter to the desired setpoints (e.g., center frequency and/or bandwidth). In some embodiments, the calibration profile may be embodied as one or more look-up tables that associate each of the plurality of digital command inputs with the associated plurality of DAC codes.

Using a calibration mode of the controller 104, further described below, the calibration profile may be customized to the specific filter 102 and/or the specific controller 104 with which it is being used and loaded into the memory 200. In addition to the calibration profile(s), the memory 200 may store part numbers, serial numbers, firmware versions, frequency band ranges, and other information relevant to the associated system 100. The memory 200 may be embodied as any non-volatile memory topology that conforms to both the address space size and physical size requirements of the target application. In illustrative embodiments, the memory 200 may be embodied as memory with efficient sequential read operations, such as NAND flash memory, to facilitate the retrieval of multiple DAC codes (one for each of the DACs 202) associated with a particular digital command input.

The DACs 202 of the controller 104 may be embodied as any circuitry capable of generating an analog biasing output in response to each of the DAC codes. The controller 104 will include at least as many DACs 202 as the number of biasing terminals 106 of the filter 102 that are to be independently driven by the controller 104. The DACs 202 may be embodied either as separate circuits or modules or as independently controllable portions of a larger DAC circuit or module. In the illustrative embodiment, the DACs 202 form part of the ASIC. In operation, each of the DACs 202 received a DAC code (a digital input) and generates an analog output (e.g., a bias voltage) in response. The controller 104 provides each analog biasing output from one of the DACs 202 to one of the biasing terminals 106 of the filter 102, directly or indirectly, as described above. In some illustrative embodiments, the DACs 202 are embodied as sigma-delta DACs, which have high conversion speed and precision. Sigma-delta DACs are able to consistently produce the same analog output when given the same digital input, even though their accuracy may vary from lot-to-lot based on manufacturing tolerances (e.g., one 30V-referenced sigma-delta DAC may consistently produce 14.85V in response to a 0x7FFF code input, whereas a different DAC of the same design may consistently produce 15V in response). This behavior can be accounted for in the calibration profile stored in the memory 200 of the controller 104, which may be customized to the specific controller 104 (including the specific DACs 202) with which it will be used. The specific DACs 202 used (and the calibration profile) may also account for the particular filter 102 with which the controller 104 is to be used.

The communication interface 204 of the controller 104 is configured to receive digital command inputs from the host system 212 associated with the system 100. As discussed above, each of these digital command inputs may be embodied as a digital command word and may represent a desired center frequency setpoint and/or a desired bandwidth setpoint for the reconfigurable RF filter 102. In the illustrative embodiment, the communication interface 204 forms part of the ASIC. In embodiments in which the memory 200 is implemented separately from the ASIC, the communication interface 204 may also handle communications between the memory 200 and the control logic 206 (e.g., reads, writes, etc.). The communication interface 204 may use any appropriate communication protocol, including, but not limited to, the serial peripheral interface (SPI), inter-integrated circuit (I2C), and low-voltage differential signaling (LVDS) protocols, among others. As described further below, in some embodiments, the communication protocol utilized by the communication interface 204 may operate to expose control registers of the controller 104 to the host system 212 (e.g., in certain operational modes of the control logic 206).

The control logic 206 also forms part of the ASIC of the controller 104 and is configured to perform several functions. One of the primary functions performed by the control logic 206 is to retrieve, from the memory 200, at least one set of DAC codes based on a digital command input received by the communication interface 204, to select a set of DAC codes based on the retrieved set(s) of DAC codes, and to provide the selected set of DAC codes to the DACs 202 (which causes the DACs 202 to generate the analog biasing outputs that cause the filter 102 to achieve the desired setpoint(s)). In the illustrative embodiment, the control logic 206 includes a group of control registers, which store values that drive a state machine 300 (illustrated in FIG. 3 and further described below). When the digital command input received by the communication interface 204 exactly matches one of the digital command inputs in the calibration profile stored in the memory 200, the control registers of control logic 206 may retrieve the associated DAC codes form the memory 200, select those same DAC codes, and then provide them to the DACs 202. In at least some embodiments, when the digital command input received by the communication interface 204 does not match one of the digital command inputs in the calibration profile stored in the memory 200, the control registers may instead retrieve two (or more) sets of DAC codes that are associated with two (or more) similar digital command inputs, select a set of DAC codes to be provided to the DACs 202 by interpolating between the retrieved sets of DAC codes, and then provide the selected (interpolated) set of DAC codes to the DACs 202. For instance, the retrieved (and then interpolated) sets of DACs codes might be associated with center frequency setpoints above and below a selected center frequency setpoint represented by the received digital command input (but not directly represented by one of the digital command inputs of the calibration profile).

The control registers of control logic 206 may illustratively include registers storing the selected setpoint(s) for the filter 102, the DAC code to be provided to each DAC 202, and values read from or to be written to the memory 200. The control logic 206 may also include additional control functions and/or register abstractions for specific memory address accesses. For example, device information stored in memory, such as a part number, may be exposed through a control register rather than requiring direct memory access. This control model limits the potential for memory corruption during nominal use. However, direct access to the DACs 202 and/or the memory 200 through the control registers may still be provided via the communication interface 204 for filter calibration. In the illustrative embodiment, the control logic 206 implements a modal control scheme, in which direct access to the DACs 202 and the memory 200 is provided by entering a calibration mode (e.g., in response to the control logic 206 receiving an appropriate digital command input).

Figure 3:
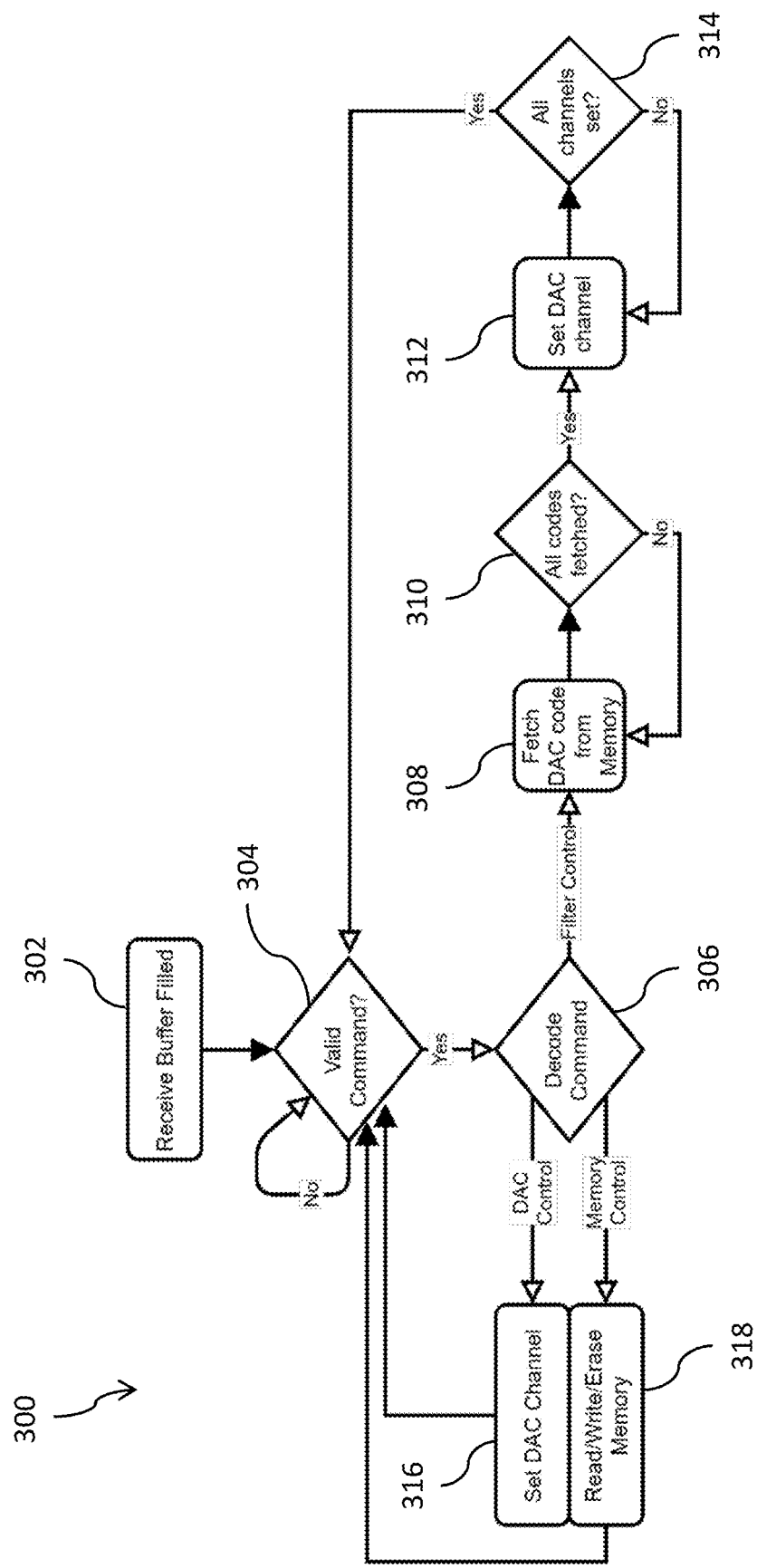
FIG. 3 is a simplified diagram of one illustrative embodiment of a state machine that may be implemented by the controller of FIGS. 1 and 2.

FIG. 3 illustrates a flow diagram of the state machine 300 that defines the operation of the controller 104 in the illustrative embodiment. The sequence begins with block 302 in which digital command inputs received at the communication interface 204 are stored in a receive buffer. At block 304, the control logic 206 determines whether the next digital command input in the receive buffer represents a valid command. If so, the control logic 206 proceeds to block 306 in which the command is decoded, and the relevant flags are asserted (e.g., a "conversion start" flag for the DACs 202). Most commonly, the received command will be a filter center frequency register write command (i.e., a tune command). For this type of command, the control logic 206 proceeds to block 308, in which a DAC code associated with the received command is read from the memory 200. At block 310, the control logic 206 checks whether the entire set of DAC codes associated with the received command have been retrieved. If not, the control logic 206 loops back to block 308 to read the next DAC code. Once all DAC codes associated with the received command have been read from the memory 200, the control logic 206 proceeds to blocks 312 and 314 in which each DAC code is provided to a corresponding one of the DACs 202 to achieve the desired analog biasing outputs.

As noted above, the control logic 206 is also able to selectively enter a calibration mode in which direct access to the memory 200 and/or the DACs 202 is provided via the communication interface 204. For instance, in response to receiving a valid command (block 304) that is decoded as a proper request for DAC control (block 306), the control logic 206 may proceed to block 316 in which it provides a DAC code received via the communication interface 204 directly to one of the DACs 202. Similarly, in response to receiving a valid command (block 304) that is decoded as a proper request for memory control (block 306), the control logic 206 may proceed to block 318 in which it provides a read, write, or erase command received via the communication interface 204 directly to the memory 200. Using this calibration mode, an external calibration system coupled to the communication interface 204 can apply various sets of DAC codes to the DACs 202 of the controller 104, measure the resultant behavior of an attached filter 102, and develop a calibration profile that is customized to the specific filter 102 and/or the specific controller 104. This customized calibration profile can then be loaded into and stored in the memory 200 for accurate and precise control of the filter 102.

In some embodiments, the control logic 206 may implement automatic temperature compensation for the reconfigurable RF filter system 100. To do so, the calibration profile stored in the memory 200 can associate each digital command input with a different set of DAC codes for each of a number of different temperatures. In other words, each combination of one of the digital command inputs and one of the temperatures will be associated with a particular set of DAC codes (e.g., in one or more look-up tables). Additionally, the control logic 206 will receive data indicative of a sensed temperature (e.g., of the filter 102 and/or the controller 104). In some embodiments, the controller 104 may integrate a temperature sensor (e.g., as part of the ASIC or communicatively coupled to the ASIC). In other embodiments, the temperature sensor may be external to the controller 104, and the data indicative of the sensed temperature may be received via the communication interface 204. In any case, the control logic 206 uses the data indicative of a sensed temperature, together with the digital command input, when retrieving the DAC codes from the memory 200, allowing the controller 104 to account for variation in the system 100 due to temperature changes. In situations where the sensed temperature does not match one of the number of different temperatures coded into the calibration profile, the control logic 206 may chose the set of DAC codes that are associated with the temperature that is closest to the sensed temperature or it may select the two sets of DAC codes associated with the temperatures above and below the sensed temperature and interpolate a new set of DAC codes between them (e.g., using a weighted average).

In some embodiments, the control logic 206 may implement frequency hoping for the reconfigurable RF filter system 100. When this mode is enabled, the control logic 206 of the controller 104 may periodically alternate which of two or more different sets of DAC codes are provided to the DACs 202, such that the tuned characteristics of the filter 102 alternate between two or more different values (e.g., two or more different center frequency setpoints). This mode of the controller 104 can facilitate frequency hopping, a common paradigm in RF communications that involves rapidly switching carrier tones between two or more pre-determined frequencies at specific time intervals for the purpose of security and signal integrity. The mode may be implemented through factory or field programming of custom hop sequences into the control logic 206 and/or the memory 200 or even embedding sequences in silicon at the design stage of the controller 104.

In some embodiments, the control logic 206 may include a selectable auto-tune mode in which the control registers receive sensor data indicative of a frequency of a desirable or undesirable signal, retrieve DAC codes associated with that frequency from the memory 200, select a set of DAC codes based on the retrieved DAC codes, and provide the selected DAC codes to the DACs 202. For instance, where the filter 102 is a bandpass filter (which allows only frequencies at and near the center frequency of the filter 102 through the device), this auto-tune mode may receive the frequency of a desirable signal and control the filter 102 in the foregoing manner to pass the desirable signal and attenuate other signals. Alternatively, where the filter 102 is a bandstop filter (which allows only frequencies not near the center frequency of the filter 102 through the device), this auto-tune mode may receive the frequency of an undesirable signal and control the filter 102 in the foregoing manner to attenuate the undesirable signal and pass other signals. In any case, the controller 104 may include a power-sensing circuit that monitors operation of the filter 102 to support the auto-tune mode by providing the sensor data.

The system clock 208 produces a phase-locked clock signal, illustratively from a crystal oscillator, that provides timing to other components of the controller 104 (such as the communication interface 204 and the control logic 206). The range of acceptable system clock frequencies will partially depend on the architecture of the other components of the controller 104, as well as the silicon process node used for fabrication of the ASIC. Most embodiments of the controller 104 can utilize clock frequencies between 50 and 100 MHz (inclusive). Faster clocks result in increased sensitivity to timing violations as the time between clock edges becomes shorter and signal propagation delay remains the same. A clock frequency in the range of 50-100 MHZ provides efficient intra-chip signaling and external communication without encountering the common drawbacks of high-speed clocks.

The power-on reset 210 of the controller 104 is responsible for ensuring the control registers of the control logic 206 are initialized to a known state when power is applied to the controller 104. Specifically, the power-on reset 210 asserts a system-wide reset signal for a time period that guarantees the reset value of each control register in the controller 104, typically on the order of hundreds of microseconds.

Figure 4:
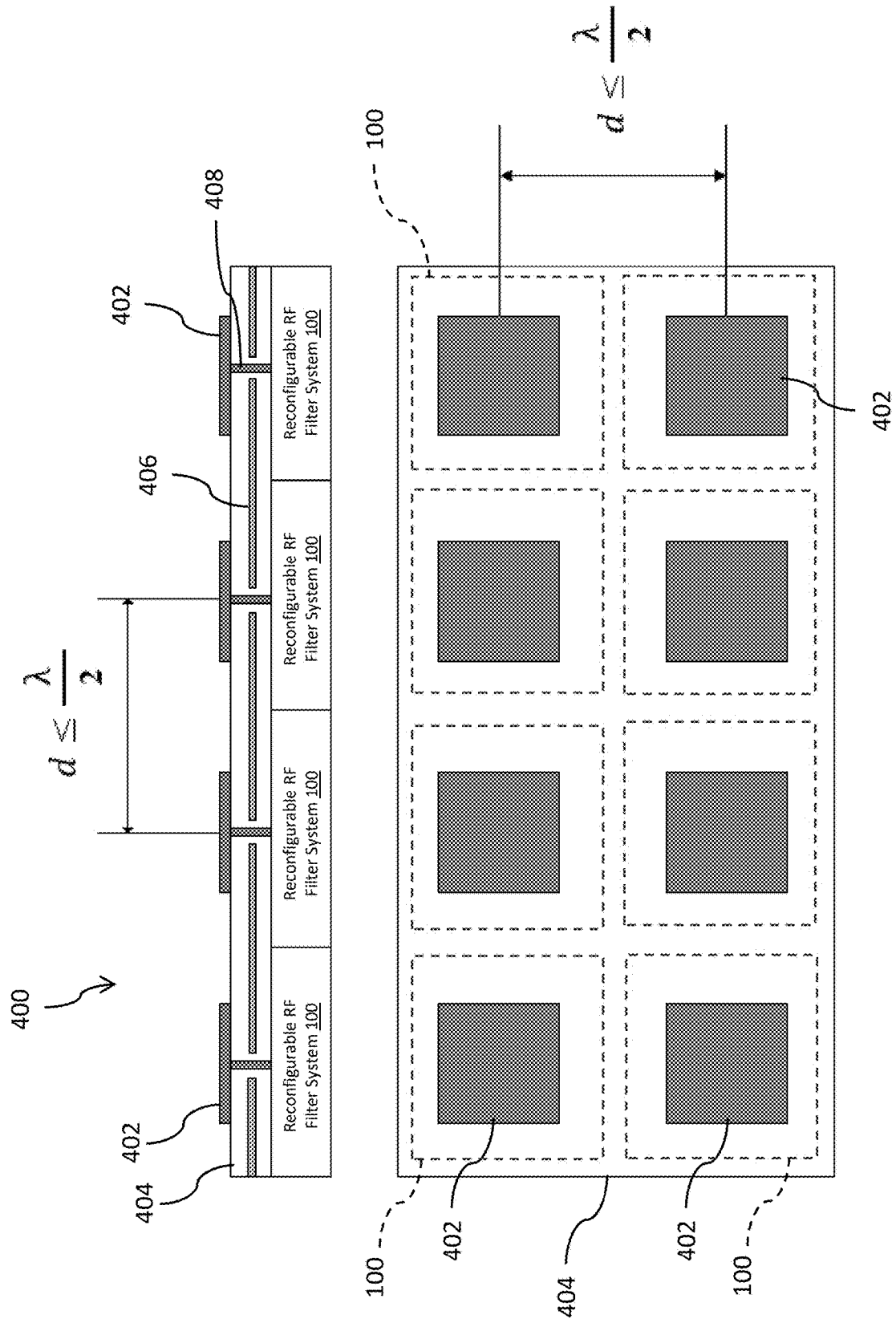
FIG. 4 is a simplified diagram of a phased array system including a plurality of antennas and a corresponding plurality of reconfigurable RF filter systems according to the present disclosure.

Referring now to FIG. 4, one illustrative application of the presently disclosed reconfigurable RF filter system 100 is shown in both a cross-sectional view and a plan view. FIG. 4 illustrates a phased array system 400 that includes an array of eight antennas 402 arranged in a two-dimensional grid pattern (specifically, a two-by-four grid). In other embodiments, it is contemplated that the phased array system 400 may include any number of antennas 402, which may be arranged in any suitable pattern, including one-dimensional (i.e., linear) or multi-dimensional patterns. Furthermore, will the antennas 402 are illustrated as square-shaped, the antennas may take any number of shapes, including complex profiles. As is known in the art, a phased array system, such as the system 400, is capable of using its grid of antennas 402 to "steer" an RF signal to a desired angle.

In the illustrative embodiment of FIG. 4, the antennas 402 are arranged on top of a substrate 404 that includes embedded RF shielding 406. Each antenna 402 has an adjacent reconfigurable RF filter system 100 (which comprises a reconfigurable RF filter 102 and a corresponding controller 104, as described above) positioned below the substrate 404. Each antenna 402 is communicatively coupled to the reconfigurable RF filter 102 of the adjacent reconfigurable RF filter system 100 by a corresponding conductive via 408 disposed through the substate 404 (possibly with intervening components between the via 408 and the filter 102). As will be appreciated from FIG. 4, in this illustrate embodiment, the antennas 402 all intersect a common plane (at or near the top of the substrate 404), while the reconfigurable RF filter systems 100 are arranged in another plane (below the substrate 404) that runs parallel to the common plane of the antennas 402.

As illustrated in FIG. 4, each antenna 402 in the phased array system 400 is spaced apart from its nearest-neighbor antenna(s) 402, in their common plane, by a distance (d) that is no more than a half-wavelength ($\lambda/2$) of a highest frequency signal handled by the system 400. By way of example, for an embodiment of the phased array system 400 handling signals with frequencies up to 20 GHz, the maximum center-to-center spacing (d) of the antenna is about 7.2 millimeters. For the reconfigurable RF filter systems 100 to be placed adjacent to each antenna 402 of the phase array system 400, the reconfigurable RF filter systems 100 must each occupy an area that is less than $d^2$ (i.e., $(\lambda/2)^2$) in a plane that is parallel to the common plane of the antennas 402, as suggested by FIG. 4. While the drawings illustrate the reconfigurable RF filter systems 100 occupying areas that are approximately square, with sides of slightly less than d, it is contemplated that the systems 100 may be shaped differently (including irregularly) so long as the total area occupied by each system 100 is less than $d^2$ in the relevant plane. While reconfigurable RF filter systems 100 of this size could not be achieved with prior art systems, the presently disclosed chip-scale systems 100 can be utilized in such applications.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There is a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A controller for a reconfigurable radio frequency (RF) filter comprising:
   memory configured to store a calibration profile associating each of a plurality of digital command inputs with a plurality of digital to analog converter (DAC) codes;
   a plurality of digital to analog converters (DACs) each configured to generate an analog biasing output in response to a DAC code;
   a communication interface configured to receive a digital command input; and
   control registers configured to retrieve, from the memory, at least one plurality of DAC codes based on the received digital command input, to select a plurality of DAC codes based on the retrieved at least one plurality of DAC codes, and to provide the selected plurality of DAC codes to the plurality of DACs;
   wherein at least the plurality of DACs, the communication interface, and the control registers form part of an application specific integrated circuit (ASIC).

2. The controller of claim 1, wherein each of the plurality of digital command inputs represents a different center frequency setpoint for the reconfigurable RF filter.

3. The controller of claim 2, wherein the retrieved at least one plurality of DAC codes comprises (i) a first plurality of DAC codes associated with a first center frequency setpoint below a selected center frequency setpoint represented by the received digital command input and (ii) a second plurality of DAC codes associated with a second center frequency setpoint above the selected center frequency setpoint represented by the received digital command input, and wherein the control registers are configured to select a plurality of DAC codes based on the retrieved at least one plurality of DAC codes by interpolating between the DAC codes of the first and second pluralities of DAC codes.

4. The controller of claim 1, wherein each of the plurality of digital command inputs represents a different combination of center frequency and bandwidth setpoints for the reconfigurable RF filter.

5. The controller of claim 1, wherein each analog biasing output is a bias voltage configured to control a corresponding varactor of the reconfigurable RF filter.

6. The controller of claim 1, wherein each analog biasing output is configured to control a corresponding current-controlled tuning element of the reconfigurable RF filter.

7. The controller of claim 1, wherein each analog biasing output is configured to control a corresponding magnetically-controlled tuning element of the reconfigurable RF filter.

8. The controller of claim 1, wherein the memory is also part of the ASIC.

9. The controller of claim 1, wherein the memory is not part of the ASIC and is communicatively coupled to the ASIC.

10. The controller of claim 1, wherein the memory comprises flash memory.

11. The controller of claim 1, wherein each DAC of the plurality of DACs is a sigma-delta DAC.

12. The controller of claim 1, wherein the calibration profile is customized to the controller to account for manufacturing tolerance in the plurality of DACs and is loaded in the memory.

13. The controller of claim 1, wherein the calibration profile associates each of the plurality of digital command inputs with a plurality of DAC codes for each of a plurality of temperatures, and wherein the control registers are further configured to receive data indicative of a sensed temperature and to retrieve the at least one plurality of DAC codes based on the received digital command input and the received data indicative of the sensed temperature.

14. The controller of claim 13, wherein the retrieved at least one plurality of DAC codes comprises (i) a first plurality of DAC codes associated with the received digital command input and a first temperature of the plurality of temperatures that is below the sensed temperature and (ii) a second plurality of DAC codes associated with the received digital command input and a second temperature of the plurality of temperatures that is above the sensed temperature, and wherein the control registers are configured to select a plurality of DAC codes based on the retrieved at least one plurality of DAC codes by interpolating between the DAC codes of the first and second pluralities of DAC codes.

15. The controller of claim 1, wherein the control registers are further configured to periodically alternate the selected plurality of DAC codes provided to the plurality of DACs to allow the reconfigurable RF filter to frequency hop.

16. The controller of claim 1, wherein the control registers are further configured to selectively enter an auto-tune mode in which the control registers receive sensor data indicative of a frequency of an undesirable signal, retrieve at least one plurality of DAC codes associated with that frequency from the memory, select a plurality of DAC codes based on the retrieved at least one plurality of DAC codes, and provide the selected plurality of DAC codes to the plurality of DACs to cause the filter to attenuate the undesirable signal and pass other signals.

17. The controller of claim 1, wherein the control registers are further configured to selectively enter an auto-tune mode in which the control registers receive sensor data indicative of a frequency of a desirable signal, retrieve at least one plurality of DAC codes associated with that frequency from the memory, select a plurality of DAC codes based on the retrieved at least one plurality of DAC codes, and provide the selected plurality of DAC codes to the plurality of DACs to cause the filter to pass the desirable signal and attenuate other signals.

18. The controller of claim 1, wherein the control registers are further configured to selectively enter a calibration mode in which direct access to at least one of the memory and the plurality of DACs is provided via the communication interface.

19. A reconfigurable RF filter system comprising:
the controller of claim 1; and
a reconfigurable RF filter having a plurality of biasing terminals, wherein each of the plurality of biasing terminals is communicatively coupled to one of the plurality of DACs of the controller to receive the corresponding analog biasing output.

20. The controller of claim 19, wherein the reconfigurable RF filter is a reconfigurable microwave filter.

21. The controller of claim 19, wherein the calibration profile is customized to the controller and to the reconfigurable RF filter and is loaded in the memory of the controller.

22. A phased array system comprising:
a plurality of antennas each intersecting a first plane, wherein each antenna of the plurality of antennas is spaced from at least one other antenna of the plurality of antennas in the first plane by no more than a half-wavelength of a highest frequency signal handled by the phased array system; and
a plurality of the reconfigurable RF filter systems of claim 19, wherein each reconfigurable RF filter system of the plurality of reconfigurable RF filter systems is positioned adjacent to a corresponding antenna of the plurality of antennas with the reconfigurable RF filter communicatively coupled to the corresponding antenna.

23. The phased array system of claim 22, wherein an area occupied by each of the plurality of the reconfigurable RF filter systems in a second plane parallel to the first plane is no more than the half-wavelength squared.

24. A method comprising:
receiving, with an application specific integrated circuit (ASIC), a digital command input representing a center frequency setpoint for a reconfigurable radio frequency (RF) filter communicatively coupled to the ASIC;
retrieving, from a memory associated with the ASIC, at least one plurality of digital to analog converter (DAC) codes in response to receiving the digital command input;
selecting a plurality of DAC codes based on the retrieved at least one plurality of DAC codes; and
providing the selected plurality of DAC codes to a plurality of digital to analog converters (DACs) of the ASIC to generate a plurality of analog biasing outputs, wherein each DAC of the plurality of DACs generates one of the plurality of analog biasing outputs in response to one of the selected plurality of DAC codes.

25. The method of claim 24, further comprising storing a calibration profile in the memory, wherein the calibration profile is customized to at least one of the ASIC and the reconfigurable RF filter and associates each of a plurality of digital command inputs with a plurality of DAC codes.

26. The method of claim 24, further comprising providing the plurality of analog biasing outputs generated by the plurality of DACs of the ASIC to a plurality of biasing terminals of the reconfigurable RF filter to tune a center frequency of the reconfigurable RF filter to the center frequency setpoint.

27. The method of claim 26, wherein the digital command input further represents a bandwidth setpoint for the reconfigurable RF filter, and wherein providing the plurality of analog biasing outputs to the plurality of biasing terminals of the reconfigurable RF filter also tunes a bandwidth of the reconfigurable RF filter to the bandwidth setpoint.

28. The method of claim 26, wherein providing the plurality of analog biasing outputs to the plurality of biasing terminals of the reconfigurable RF filter comprises providing the plurality of analog biasing outputs to a plurality of biasing terminals of a reconfigurable microwave filter (RMF).

29. The method of claim 28, wherein the plurality of analog biasing outputs comprise bias voltages, and wherein providing the plurality of analog biasing outputs to the plurality of biasing terminals of the RMF provides the bias voltages to varactors of the RMF.

30. The method of claim 26, further comprising transmitting a signal through the reconfigurable RF filter to an adjacent antenna of a phased array, while the center frequency of the reconfigurable RF filter is tuned to the center frequency setpoint, wherein the adjacent antenna is spaced apart from another antenna of the phased array by no more than a half-wavelength of a highest frequency component of the signal as measured in a first plane intersected by both the adjacent antenna and the another antenna, and wherein an area occupied by the reconfigurable RF filter and the ASIC in a second plane parallel to the first plane is no more than the half-wavelength squared.

* * * * *